United States Patent
Closson, Jr.

[11] 3,892,078
[45] July 1, 1975

[54] TEXTURED SHOE STIFFENER BLANK

[76] Inventor: Addison W. Closson, Jr., c/o Proctor Laminar Division 32 Calvin Rd., Watertown, Mass. 02172

[22] Filed: Aug. 17, 1972

[21] Appl. No.: 281,291

[52] U.S. Cl. .................... 36/68; 156/244; 428/141; 428/215; 428/520
[51] Int. Cl. ....................... A43b 13/42; B32b 3/26
[58] Field of Search .......... 161/160, 116, 413, 159; 36/44, 68, 77 M; 263/2.5 P, 2.5 HA; 264/45, 54; 117/138.8 E, 161 HC

[56] References Cited
UNITED STATES PATENTS

| | | | |
|---|---|---|---|
| 3,076,234 | 2/1963 | Paulus | 260/2.5 HA |
| 3,211,677 | 10/1965 | Feild et al. | 260/2.5 P |
| 3,355,319 | 11/1967 | Rees | 117/138.8 E |
| 3,431,163 | 3/1969 | Gilbert | 161/161 |
| 3,446,685 | 5/1969 | Goldstone et al. | 161/160 |
| 3,519,527 | 7/1970 | Crowley | 161/160 |
| 3,616,170 | 10/1971 | Closson | 161/159 |
| 3,620,898 | 11/1971 | Harris | 161/160 |
| 3,632,532 | 1/1972 | Gaeth et al. | 260/2.5 HA |
| 3,658,617 | 4/1972 | Fearmow et al. | 161/160 |

FOREIGN PATENTS OR APPLICATIONS 999,515    7/1965    United Kingdom............ 265/45

Primary Examiner—George F. Lesmes
Assistant Examiner—R. J. Roche
Attorney, Agent, or Firm—Cesari & McKenna

[57] ABSTRACT

A process, and novel product produced thereby, for forming a laminate comprising a thin, embossed, cured resin layer and a resin substrate. The laminating step comprises the simultaneous cross-linking of said embossed resin and chemical bonding of the embossed resin to said substrate.

21 Claims, 4 Drawing Figures

TEXTURED SHOE STIFFENER BLANK

BACKGROUND OF THE INVENTION

There are a number of commercial applications for thermoplastic sheet material wherein cloth or other such textured decorative coating is laminated to the sheet to obtain some aesthetic or functional surface property. The replacement of cloth with an organic polymeric substance would usually yield an advantage in materials cost. The problem in achieving such a replacement has been, primarily, one of finding a suitable process for (1) coating the substrate material economically while achieving a suitable bond, (2) imparting appropriate aesthetic and physical, e.g., heat resistant, properties to the coating material, and (3) achieving these objectives by an economically feasible process.

The desirable properties which an ideal surfacing material might have are:

1. Low cost,
2. Wear resistance,
3. Attractive textured surface having appropriate friction properties
4. Lack of tack at last temperature, e.g., temperature as high as 350°F The most common approach to the problem is to either settle for planar (i.e., 2-dimensional) decorative coating or to use a relatively thick embossed material and afix it to the substrate with an adhesive.

The laminate so-formed must also be thermoformable on molding equipment and must be resistant to chemical and thermal stresses encountered in washing. A particularly difficult application is that wherein it is desirable to form a flexible thermoformable material which will serve as an adequate material for making heel counter-stiffener blanks such as those used in the molded shoe industry. This type of shoe stiffener material is described in U.S. Pat. No. 3,616,170, but the materials described therein are surfaced with drill cloth material which is both expensive and subject to becoming worn through and unsightly because of wear.

SUMMARY OF INVENTION

It is an object of the present invention to provide a novel plastic sheet material comprising a thin, heat resistant, textured synthetic resin coating thereon.

Another object of the invention is to provide a plastic sheet material wherein said thin coating is an abrasion-resistant coating, chemically bonded to the substrate and forming an adhesive-free bond therewith.

A further object of the invention is to provide a compressible laminate having a void-containing (i.e., closed-cell) thermoplastic substrate and a thermoset, heat resistant relatively abrasion-resistant, coating thereover wherein the coating has an embossed textile pattern to impart such friction, wear and aesthetic properties to the surface of the laminate that the laminate can serve as a stiffener material.

Another object of the invention is to provide a cross-linked coating which is heat resistant and sufficiently extensible so that it will not be destroyed when a foam substrate is subsequently bent and heated by application of processing machinery to parts thereof.

It is also an object of the invention to provide a novel process whereby such laminates as disclosed above can be effectively and economically manufactured, said process comprising the steps of using an embossed sheet or roll as a mold for receiving a liquid resin composition, removing volatile liquid from the composition, and then, chemically bonding the dried resin composition to a substrate while the resin is being cross-linked.

Another object of the invention is to provide a novel sheet material useful in making shoe stiffener blanks for use in so-called molded shoes, e.g., sneakers and the like, and to provide novel shoe stiffener blanks made from the novel material.

A further object of the invention is to provide a novel shoe stiffener article.

Other objects of the invention will be obvious to those skilled in the art on their reading of the instant specification.

The above objects have been substantially achieved by forming a laminate comprising a thin, cured, organic polymer coating chemically bonded to a polymeric substrate.

The process whereby the desired combination of texture, thinness, and bonding are achieved is the key to successful formation of this new product; but it is also desirable to select materials for coating and substrate which have a chemical affinity for one another. By chemical affinity is meant any adhesive attraction of the coating for the substrate or vice-versa, which is a result of the chemical or physical interaction of the coating and substrate materials. Therefore, "chemical affinity" usually will relate to an adhesive character of at least one of the coating and substrate, and is meant to describe a condition wherein no extraneous adhesive is required to bond coating to substrate. The bond between coating and substrate is greater than the cohesive tensile strength of the coating itself.

It is, of course, not much of a problem to put a thin polymeric coating on a substrate. However, when it is necessary to put a thin crosslinked, textured (i.e., three-dimensional) coating on the surface, the problem is more complex.

One of the applicant's solutions to the problem is to place a liquid resin either on an embossed or textured release sheet or metal embossing roll. Such a release sheet is readily available in a number of designs: e.g., alligator skin; various cloths such as denim, linen and the like; snakeskin; etc. The release sheet is usually formed of treated paper.

Once the liquid resin is placed on the casting sheet or embossing roll and fills the embossed, mold-like surface thereof, the resin is caused to increase in viscosity so that it will faithfully maintain the image of the casting sheet. This increase in viscosity is preferentially carried out by evaporation of a liquid medium in which the coating resin has been dissolved or dispersed in an oven or by heating the cored embossing roll. However, it is also possible to increase the viscosity of the resin by a partial polymerization, partial cross-linking of any other preliminary processing step which will markedly reduce or destroy the original flow characteristics of the coating resin, which were necessary to get it into the depressions of the casting sheet. The preforming step described above will henceforth be called the "drying" step in order to simplify the following description:

The embossed release sheet or embossing roll carrying the dryed coating resin is placed in snug contact with the polymeric substrate on one face of the release sheet on the other side. During this contact period, the temperature of the foam, advantageously, is maintained at a point high enough wherein an adhesive bond is formed by the reaction of the coating resin with the substrate resin as well as to effect a simultaneous curing or crosslinking reaction.

In ths most advantageous embodiments of the invention, that the coating resin will be crosslinked to a relatively high abrasion resistance value. This abrasion resistance is best characterized by a Taber abrasion test using an H18 wheel, with a 500 gram weight, and experiencing a coating weight loss of 0.1 grams by weight or less after 100 cycles when the original coating averages 2 mils thick and using an S-36 specimen mounting card available from Teledyne Taber of North Tonawanda, N.Y., U.S.A.

It may be the same chemical activity that results in cross-linking also facilitates the adhesion to the substrate; on the other hand, it may be an entirely different chemical phenomenon that contributes to the chemical adhesion of coating and substrate. In any event, it is most important that the formation of the adhesive bond is sufficiently strong that, when the release sheet is pulled away from the substrate, the thin resin coating remains thereon. The release sheet can be reused. The coating product of the invention is ready for further processing or packaging.

The coating should be from 0.5 to 6 mils thick and the pattern should comprise a ratio in thickness between high spots and low spots of at least 1.5:1. The interface between coating and foam substrate will be substantially planar.

A particularly advantageous embodiment of the invention is that relating to the placement of a thin decorative coating of resin on a layer of polymeric foam. It will be understood that a polymeric foam, especially when hot, cannot be subjected to much pressure to effect an adhesion thereto. If this were done, the foam would collapse. However, foams, most especially closed-cell foams, are sufficiently self-insulating that (a) they can stand a relatively intense external heat treatment when necessary for obtaining crosslinking of the coating of choice and for facilitating the adhesive action between coating and foam and (b) they provide a poor heat sink tending to keep any auxiliary heat used for curing nearer the surface where it can be utilized to facilitate the adhesion and crosslinking of the coating. The first aspect, i.e., the self-insulating aspect can be especially important when one is operating with sheet foam materials having a relatively low softening point, e.g., polyethylene-vinyl acetate, copolymers, or the like, which are particularly desirable for use with shoe counter blanks.

Another aspect of the invention relating especially, although not exclusively, to polymeric foam materials is the fact that the sheet material is sometimes compressed or distended in processing. For such applications, it is particularly advantageous if the cured coating materials have a certain extensibility to accomodate such modest stresses. It has been found that so-called ionically-crosslinked ionomer resins, such as those sold under the trade designation Surlyn by DuPont, are particularly useful in formation of valuable coating resins in such applications because they tend to impart some extensibility necessary to survive such processing. They also have an adhesive character wherein they facilitate an interaction with the ethylene vinyl acetate copolymer foams of choice.

In most advantageous embodiments of the invention, an adhesive-contributing resin component of the coating is used in combination with a crosslinking component of the resin system which is characterized by relative hardness and which contributes to the heat and abrasion resistance of the coating "Ionomers" as a class are described in U.S. Pat. No. 3,264,272 with particular reference to carboxylated polymers which are preferred for use in the present invention.

The coating is advantageously non-tacky at a temperature up to 370°; however resins which are non-tacky at temperatures of 150°F and below are useful in some applications. Sufficient amounts of the crosslinking or hardening resin component must be used with an ionomer to achieve this result. Most advantageously the coating resin is sufficiently hard to exhibit a Shore A durometer of 35 to 70 or more at room temperature.

The ethylene vinyl acetate copolymer foam is usually a vinyl acetate-ethylene copolymer foam having 2 to 18% vinyl acetate content. Most advantageous are those copolymers having 5 to 12% of vinyl acetate. The vinyl acetate groups are believed to contribute importantly to the bond with the coating. Other illustrative polymer foams that can be used in addition to polyethylene are those formed of poly (vinylchloride), the chlorosulforated polyethylene sold by DuPont under the trade designation Hypalon, a chlorinated polyethylene sold ionomer the trade designation Tyrin by Dow Chemical Company, and the butadiene-styrene copolymer sold by Shell Chemical under the trade designation Kraton, as well as the inomer known as Surlyn sold by DuPont, or mixtures of the above. All of these materials are thermoplastic elastomers and are the preferred ethylene-vinyl acetate copolymers. The foam-type substrate will typically contain 20% to 70% by volume of voids and is desirably free of external plasticizers.

In the novel products of the invention, the peel strength between a thin, patterned coating and the foam substrate exceeds the cohesive strength of the coating itself. Moreover, although the substrate remains thermoplastic, thereby allowing its subsequent use in processes requiring a thermoformable material, the coating becomes thermoset yet is not brittle at the relatively thin coating thicknesses that are utilized.

By "thin coating" is meant a coating wherein the average weight of resin coating per ream (30000 square feet) of substrate is from 5 to 60 lbs. per ream and wherein the maximum vertical depth of the embossed coating is at least 0.5 mil, but not over six mils. In general, cloth-type patterns are those which best provide the anti-slip properties required of heel-counter stiffeners in shoes.

Illustrative Examples of the Invention

In order to point out more fully the nature of the present invention, the following working examples are given as illustrative embodiments of the present process and products produces thereby.

EXAMPLE 1

This example illustrates the coating of a closed-cell polymeric sheet material with a crosslinked protective and decorative polymeric system.

The substrate selected is a blue sheet of ethylenevinyl acetate copolymer foam. The foam is closed-cell material of about 0.055 inches thick and having a specific gravity of about 0.5. The vinyl acetate content of the polymer is about 9½%. Such a sheet material is commercially available from Proctor Laminar Inc. of St. Louis, Mo.

A crosslinked coating system is formed from the following ingredients:
1. An ionomer supplied in the form of an agueous dispersion, sold under the trade designation Elvax D 1249 by E. I. DuPont de Nemours and Co., Inc. (30.4 lbs. wet weight).
2. A crosslinking agent in the form of a 76% solution of methylated methylol melamine resin. Such a material is sold under the trade designation Resiloom RM-441 by Monsanto Company (19.2 lbs., wet weight).
3. An ammonium bromide solution formed of 13.6 lbs. of water and 2.35 lbs of NH₄OH solution (26°Baume).
4. A 10% solution of sodium hydroxide (0.77 lbs. wet weight).
5. 1.5 parts of a pigment based on (Harshaw Ultramarine Blue W4013) and compounded so that the color of the coating is matched to the color of the foam substrate.

A small amount of silicone antifoam agent is added to the coating formulation. It has also been found desirable to adjust the viscosity of the coating to about 30,000 centipoises as measured by Brookfield viscosimeter (No. 6 Spindle). The viscosity adjustment is suitably carried out with known thickening agents, for example, an acrylic polymeric thickener sold under the trade designation Acrysol ASE-60 by Rohn and Haas Company.

The casting sheet selected for use was one with a cloth-like embossment. It is sold under the trade designation Strip-Cote, Vel Matte, CIS Denim, by S. D. Warren Company. The paper is characterized by a denim-like cloth impression on the coating surface of the paper.

The coating composition was coated onto the embossed side of the linen-embossed casting sheet by conventional knife-coating techniques. A coating weight of about 28 lbs. per ream (on a dry basis) is applied to the casting sheet. After the coating is so applied, it is dried in an air-circulating oven at an air temperature of about 240°F. This procedure takes about 3 minutes. The temperature is selected to obtain balance between good drying speed and excessive premature crosslinking of the coating.

The aforesaid polyethylene vinylacetate copolymer foam is of about 60 mils in thickness. The foam is about 300° - 320°F when it is contacted by the paper. This temperature assures sufficient chemical activity to achieve a bond between coating and substrate. The pressure at the nip rolls is sufficient to compress the foamed extrudate about 10 to 20%, or to 48 - 55 mils in thickness.

Such a sheet of foam comprising 9% vinyl acetate and a specific granity of 0.55 grams per cc has a Bayshore resiliency of 30% and a Satra flex life of 2410 cycles. In general, a shoe stiffener laminate, prepared according to the invention should have a Bayshore resiliency of from 15% or higher. The cured coating should be such that it does not crack under conditions of use; i.e., when it is heated to over 130°F and molded into a shoe with the coating facing the heated cast which will have a minimum radius of at least about one inch.

EXAMPLE 2

The product of Example 1 is made, but using a hot EVA copolymer substrate, coating it with the coating composition of Example 1, but instead of using a coated casting sheet mold, a heated, embossed roll is used to pick up the coating, dry it and press it against the hot extrudate as the hot extrudate passes through a nip between the embossed roll and a backing roll. A portion of the coating formulation was molded and cured in a shallow cup. The cured coating had a Shore A durometer of 45° at 70°F.

IN THE DRAWINGS

Figure 1:
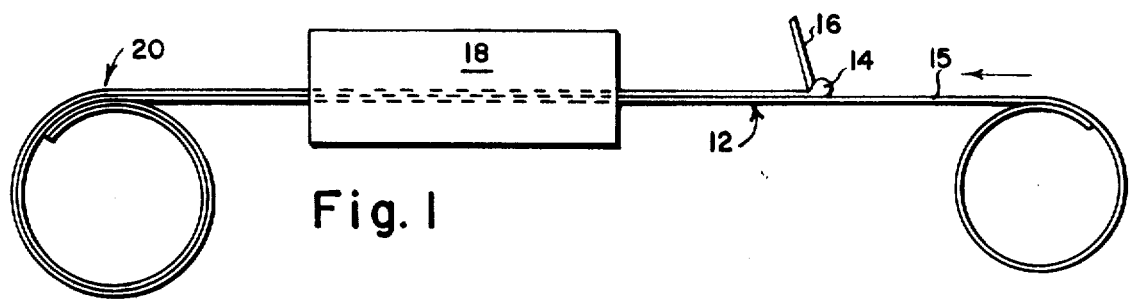
FIG. 1 is a schematic diagram of the coating of a casting sheet mold for use in the process of the invention.
Figure 1A:
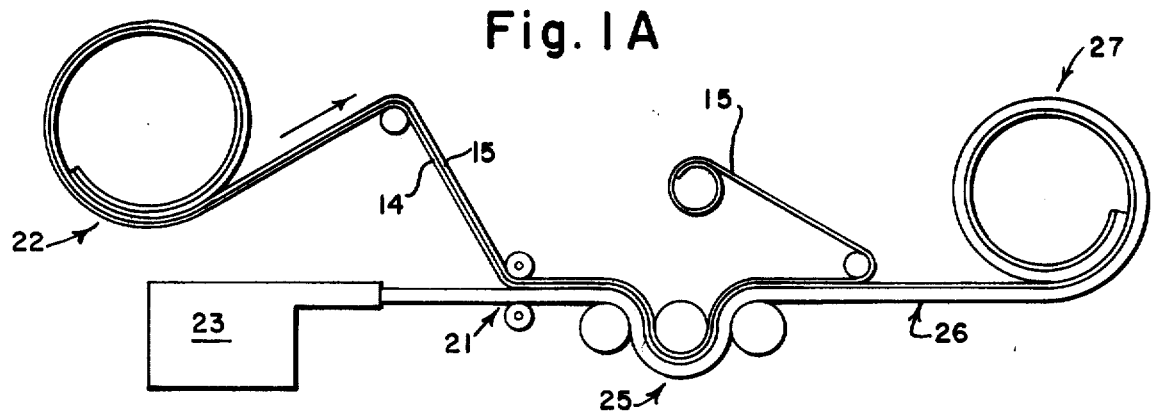
FIG. 1A shows the use of the aforesaid mold in forming a laminate according to the invention.

The rest of the process is suitably described with reference to FIGS. 1 and 1A wherein the coated paper 12 is formed by application of curable coating resin 14 by means of a knife-coated 16 to a casting sheet 15. The coated paper is passed through an oven 18 at 240°F to remove the water and to convert the coating to a dry, but largely uncured, solid form. This dry coating is wound for storage as shown at 20. When ready for use the material is unwound at 22 and passed through the nip rolls 21 with a web of hot ethylene-vinyl acetate copolymer foam continuously discharged from extruder 23. The uncured material is sufficiently reactive to be pulled off the casting sheet and passed over a 3-roll stack 25 heated to about 300°F. The heat from the foam is the principal source of heat for curing the coating to an abrasion-resistant finish while the casting sheet and foam are held together. Then, the laminated product 26 is wound as at 27 for storing and shipment.

Figure 2:
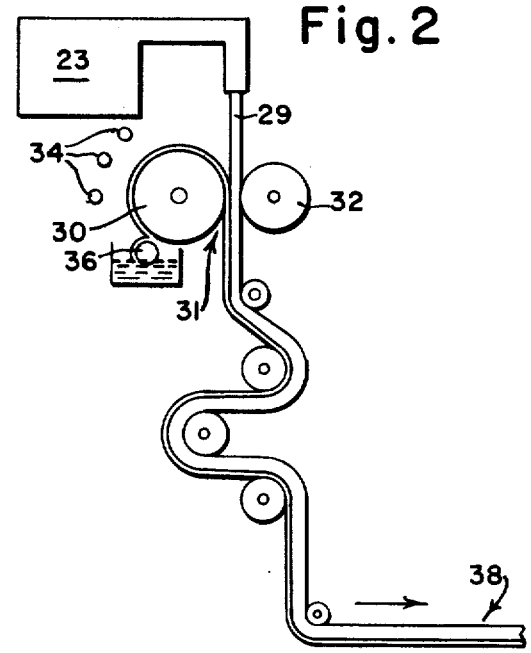
FIG. 2 shows an alternate method of forming the product of the invention.

An alternate procedure is shown schematically in FIG. 2 wherein the sheet of copolymer foam 29 is extruded downwardly to a nip 31 between an embossed roll 30 and a backing roll 32. The embossed roll is steam-heated and several radiant heaters 34 are mounted around the roll between a coating roll 36 which meters a curable coating composition onto roll 30, and nip 31. The coating is dried during its passage from coating roll 36 to nip 30 and is attracted from the roll onto the adjacent hot surface of foam sheet 29, forming the laminate product 38.

Figure 3:
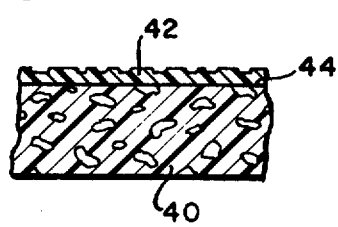

FIG. 3 is a schematic cross-sectional view of a product of the invention showing the closed-cell substrate 40 and the patterned coating 42 of crosslinked resin attached thereto by a bond 44 which is free of any additional adhesive-promoting material.

The product, the preparation of which has been described above, is formed into a shoe stiffener blank and utilized to make counter-stiffening elements of a typical design, known in the art, to be useful in sneakers. These counter-stiffening elements are stitched into the backpart section of the upper, of fabric, sections of sneakers and then joined according to the well-known Desma injection molding process, to the sole section of the sneakers to form the completed shoe.

The injection molding operation is carried out at molding temperatures cycling between 140°F and 260°F for a 1.5-minute cycle on a Desma Werke Injection Molding Machine. A commercially-available, poly (vinyl chloride) base, sole composition supplied by B. F. Goodrich Co., under the trade designation, Pliovic, is utilized in this operation. Despite the use of the extra-thick counter (of 0.055 inches thickness), the sneakers formed by this process exhibit no bulge. Moreover, there is no breakage of the thin coating when it is bent inwardly at a 1-inch radius during the molding operation.

When the same operation is carried out with 0.055-inch thick counter-stiffeners made of conventional semi-cured rag stock rubber, a noticeable and unsightly bulge results. Furthermore, 1.5 minutes of heat at 150°F is not enough time and temperature to cure a rubber rag-stock formula.

Use of the foamed thermoplastic stiffening unit eliminates the back seam ridge. This ridge is formed at the place where the quarters are stitched together and is normally covered with an overlay of tape. Frequently, after washing, the tape comes loose and allows this ridge to show through the lining of the shoe. The foamed thermoplastic stiffener is compressible when hot and allows the seam ridge to imbed itself in the thickness of the counter and thereby eliminate the possibility of its subsequent shadowing through the lining. This feature of the stiffener improves the looks and comfort of the shoe.

It is to be emphasized that the foregoing attributes of a counter stiffener formed according to the invention are due primarily to the nature of the foam substrate which is old. The particular contribution of the present invention relates to a novel counter-stiffener laminate wherein expensive cloth is replaced with a thin, embossed thermoset resin while maintaining or improving the functionality of the counter-stiffener.

It is, of course, to be understood that the foregoing example is intended to be illustrative, and that various changes can be made in the ingredients, proportions and conditions set forth therein without departing from the spirit of the invention as defined in the appended claims.

What is claimed is:

1. A flexible laminate sheet structure suitable for use in forming a shoe counter stiffener and having a (a) relatively thick substrate formed of a closed-cell foam of a thermoplastic elastomer of from 30 to 70 mils in thickness and comprising 20 to 70% of void volume and (b), adherently and directly bonded to said substrate, a relatively thin textured coating of a single crosslinked and thermoset resin coating composition having a Shore A durometer value of from 20 to 70, said coating being coextensive with said laminate sheet wherein the maximum thickness of said textured coating is from 0.5 to 6 mils, wherein the coating comprises a ratio in thickness between high spots and low spots of at least 1.5 to 1.0.

2. A laminate as described in claim 1 wherein said substrate is formed of a sheet of a copolymer of ethylene and vinyl acetate.

3. A laminate as described in claim 2 wherein said substrate and coating are colored to substantially the same color and wherein said coating is textured.

4. A laminate as described in claim 2 wherein said textured coating is formed of a thermoset resin having a Taber Abrasion Value of up to about 0.1 gram coating weight loss at 100 cycles and 1.5 mil average coating thickness.

5. A laminate as described in claim 3 wherein said textured coating is formed of a thermoset resin having a Taber Abrasionn Value of up to about 0.1 gram coating weight loss at 100 cycles and a 2.0 mil average coating thickness.

6. A molded shoe counter stiffener formed of the laminate defined in claim 1.

7. A molded shoe counter stiffener formed of the laminate defined in claim 2.

8. A molded shoe counter stiffener formed of the laminate defined in claim 3.

9. A molded shoe counter stiffener formed of the laminate defined in claim 4.

10. A laminate as described in claim 1 wherein indentations relating to said textured coating are substantially limited to said coating and wherein said bond between said substrate and coating is defined by a substantially planar interface.

11. A laminate as described in claim 2 wherein indentations relating to said textured coating are substantially limited to said coating and wherein said bond between said substrate and coating is defined by a substantially planar interface.

12. A laminate as described in claim 4 wherein indentations relating to said textured coating are substantially limited to said coating and wherein said bond between said substrate and coating is defined by a substantially planar interface.

13. A laminate as described in claim 1 wherein said thermoplastic is an ethylene vinyl acetate copolymer and wherein said resin coating is non-tacky below temperatures of 140°F.

14. A laminate as described in claim 1 wherein said thermoplastic is an ethylene vinyl acetate copolymer and wherein said resin coating is non-tacky below temperatures of 370°F.

15. A laminate as described in claim 14 wherein said textured coating is formed of a thermoset resin having a Taber Abrasion Value of up to about 0.1 gram coating weight loss at 100 cycles and a 2.0 mil average coating thickness.

16. A molded shoe counter stiffener formed of the laminate defined in claim 13.

17. A laminate as described in claim 2, wherein said coating is formed of a composition comprising an amount of cross-linked ionomer resin effective to enhance the bond between said copolymer and said coating and wherein said copolymer comprises at least 2% vinyl acetate.

18. A laminate as defined in claim 17, wherein said bond between substrate and laminate is a planar bond and said substrate is of uniform thickness.

19. A laminate as described in claim 3, wherein said coating is formed of a composition comprising an amount of cross-linked ionomer resin effective to enhance the bond between said copolymer and said coating and wherein said copolymer comprises at least 2% vinyl acetate.

20. A laminate as described in claim 4, wherein said coating is formed of a composition comprising an amount of cross-linked ionomer resin effective to enhance the bond between said copolymer and said coating and wherein said copolymer comprises at least 2% vinyl acetate.

21. A laminate as described in claim 5, wherein said coating is formed of a composition comprising an amount of cross-linked ionomer resin effective to enhance the bond between said copolymer and said coating and wherein said copolymer comprises at least 2% vinyl acetate.

* * * * *

UNITED STATES PATENT OFFICE
CERTIFICATE OF CORRECTION

Patent No. 3,892,078  Dated July 1, 1975

Inventor(s) Addison W. Closson, Jr.

It is certified that error appears in the above-identified patent and that said Letters Patent are hereby corrected as shown below:

Column 4, line 48  "30000" should read -- 3,000 --.

Signed and Sealed this eleventh Day of May 1976

[SEAL]

Attest:

RUTH C. MASON
Attesting Officer

C. MARSHALL DANN
Commissioner of Patents and Trademarks